United States Patent [19]
O'Boyle

[11] Patent Number: 5,649,781
[45] Date of Patent: Jul. 22, 1997

[54] LINKAGE MECHANISM BETWEEN STRUCTURAL MEMBERS

[75] Inventor: Kevin J. O'Boyle, Wellsville, N.Y.

[73] Assignee: ABB Air Preheater, Inc., Wellsville, N.Y.

[21] Appl. No.: 452,519

[22] Filed: May 30, 1995

[51] Int. Cl.⁶ .................................................. B23P 11/00
[52] U.S. Cl. ........................... 403/163; 29/434; 52/645; 403/68; 403/119
[58] Field of Search ............... 52/645, 646; 403/66, 403/68, 70, 119, 161, 162, 163; 29/434

[56] References Cited

U.S. PATENT DOCUMENTS

| | | | |
|---|---|---|---|
| 1,015,347 | 1/1912 | Schnaus | 403/162 |
| 1,183,596 | 5/1916 | Sachse | 403/161 X |
| 1,203,959 | 11/1916 | Atkinson | 403/66 |
| 1,587,678 | 6/1926 | Remington | 403/66 |
| 1,801,474 | 4/1931 | Williams | 403/119 X |
| 3,029,697 | 4/1962 | Okner | 403/161 X |
| 3,438,663 | 4/1969 | Colson | 52/645 X |
| 3,491,397 | 1/1970 | Hesener | 403/161 X |
| 3,499,208 | 3/1970 | Gross et al. | 29/434 |
| 4,063,832 | 12/1977 | Bauer et al. | 403/119 X |
| 4,141,109 | 2/1979 | Farrell | 403/119 X |
| 4,192,622 | 3/1980 | Stecklein | 403/163 X |

FOREIGN PATENT DOCUMENTS

| | | | |
|---|---|---|---|
| 364605 | 11/1962 | Switzerland | 52/645 |
| 920537 | 3/1963 | United Kingdom | 52/646 |

Primary Examiner—Blair Johnson
Assistant Examiner—Andrea Chop
Attorney, Agent, or Firm—Chilton, Alix & Van Kirk

[57] ABSTRACT

A connecting linkage is provided between two structural members which includes a pinned connection to allow rotation of one structural member with respect to the other and which permits adjustment and alignment before locking the device in position without the need for drilling a precisely positioned hole for the pin in the structural member. An oversized hole is formed in one of the structural members and the pin is placed through the hole. A first support plate having pin-sized holes is then placed over each end of the pin followed by a second pair of support plates also having pin-sized holes. The assembly is then moved with respect to the first structural member as permitted by the oversized hole around the pin into a desired position. The second pair of support plates are then welded to the second structural member and the first pair of support plates are welded to the first structural member. If desired, the pin may be welded to the second pair of support plates. The first pair of support plates and the first structural member are free to rotate about the pin and with respect to the second pair of support plates and the second structural member.

2 Claims, 2 Drawing Sheets

LINKAGE MECHANISM BETWEEN STRUCTURAL MEMBERS

BACKGROUND OF THE INVENTION

The present invention relates to a pinned connection between structural members permitting rotation of the members around the pin and particularly to an arrangement which permits easy assembly and adjustment.

In many situations, it is desirable to provide a pinned connection between structural members so as to permit slight rotations of one member with respect to the other member. An example would be where some flexibility is desired or where thermal expansion must be accommodated. A specific example is between the vertical support columns and the horizontal radial support beams in a large rotary regenerative air preheater. The problem that is encountered in assembling these structural members is that the precisely drilled holes for the pins in the members and the connecting linkage devices rarely align making assembly very difficult.

SUMMARY OF THE INVENTION

A connecting linkage is provided between two structural members which includes a pinned connection to allow rotation and which permits adjustment and alignment before locking in position. More specifically, the connecting linkage includes a first pair of members having holes therein for the pin to be attached to one of the structural members, a second pair of intermediate members also having holes therein for the pin which will be attached on opposite sides of the other structural member and an oversized hole in the other structural member to permit assembly and adjustment before locking the first and second pairs of members to the respective structural members. A further aspect of the invention permits the structural members to be skewed with respect to each other.

DESCRIPTION OF THE PREFERRED EMBODIMENTS

The drawings generally show two structural members attached together according to the present invention. When referring to structural members, these include various combinations of columns, beams and even base plates or platforms on the ground or floor. It is only limited to the connection of one item to another through a pinned connection.

Figure 1:
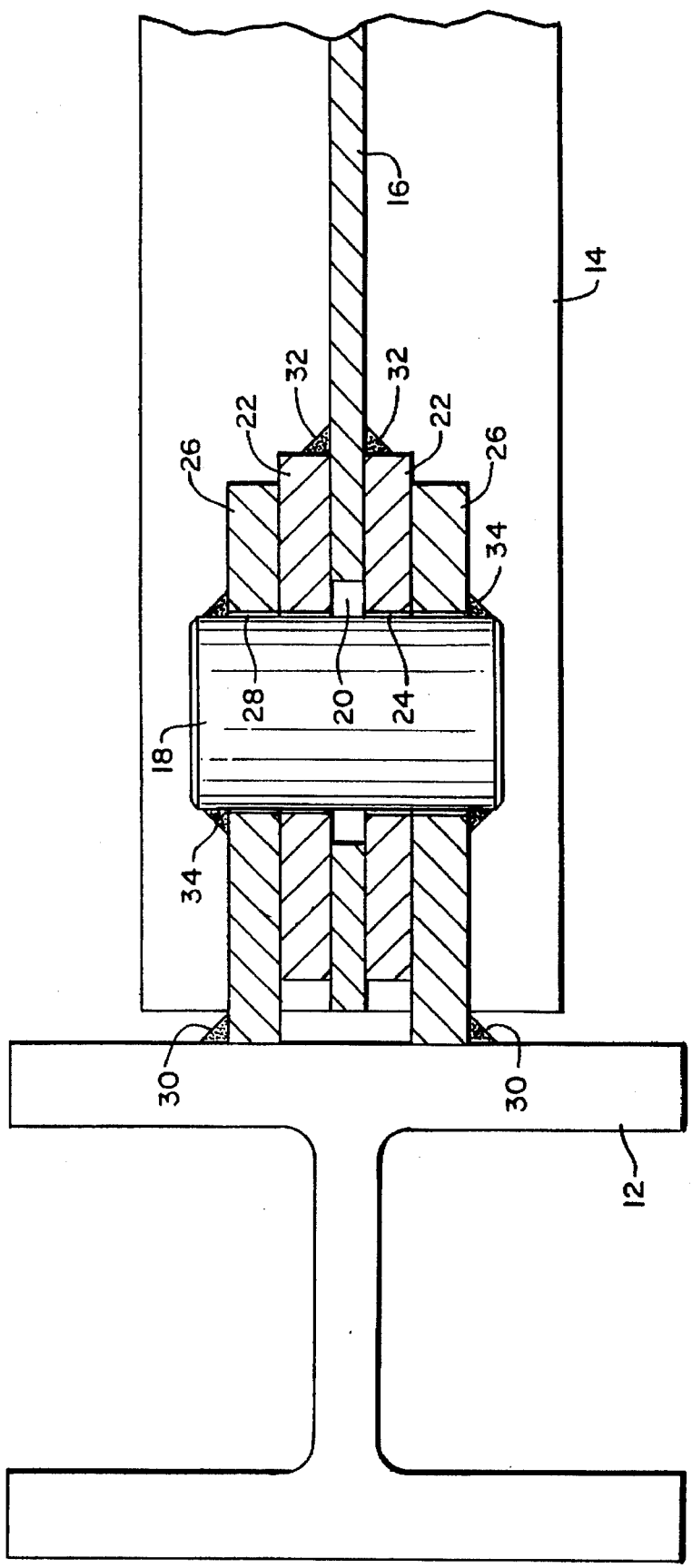
FIG. 1 is a cross section view of one beam connection to another beam, column or base according to the present invention.

FIG. 1 is illustrative of the present invention and involves the connection of one structural member 12, which could be the top view of a vertical column, shown as an I-beam, to another structural member 14, which could be a horizontal beam, also shown as an I-beam with the web 16. It is desired to connect the two members together with the pin 18 but it is not always known exactly where the hole for the pin 18 should be located in the web 16 of the I-beam 14. Therefore, according to the present invention, the web 16 of the I-beam 14 has an oversized hole 20 formed for the pin 18. The term oversized hole is used herein to mean a hole which is sufficiently larger than the pin 18 to permit movement of the structural member with respect to the pin to the amount required for the desired amount of adjustment. In order to attach the two structural members 12 and 14 together, the pin 18 is first inserted through the oversized hole 20 in the web 16. Next, the two intermediate members or plates 22 with pin-sized holes 24 are placed over the pin 18, one on each side of the web 16. Pin-sized holes means which are just large enough to permit assembly over the pin but small enough to essentially prevent movement. The two outside members or plates 26 with pin-sized holes 28 are then placed on the pin 18 again with one on each side of the web 16. Since the pin 18 is through the oversize hole 20 in the web 16, the entire linkage assembly of the pin 18, plates 22 and plates 26 can be moved with respect to the beam 14 into the proper position for attachment to the column 12.

After the linkage assembly has been moved (horizontally and/or vertically) into the proper position, the two outside members 26 are attached to the column 12 such as by the welds 30. That attachment fixes the pin 18 with respect to the column 12. Next, the intermediate plates 22 are attached to the web 16 of the beam 14 such as by the welds 32. That rotatably fixes the beam 14 to the pin 18. Therefore, the beam 14 is now rotatably fixed to the column 12 through the pin 18. If desired, the pin may be secured to the outside plates 26 by the welds 34 to hold the pin in place.

Figure 2:
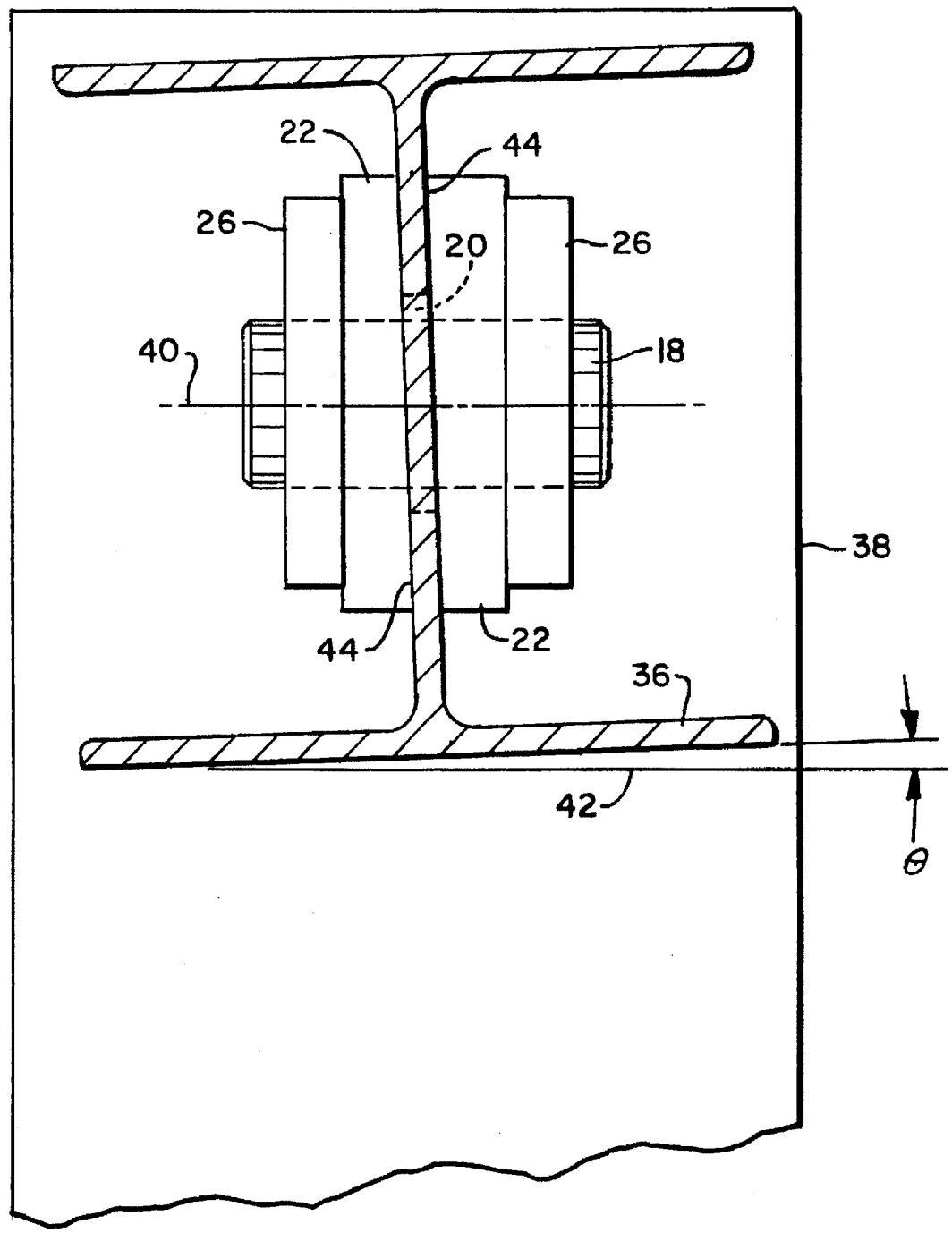
FIG. 2 is a modified embodiment of the present invention adapted to accommodate skewing between members.

Another embodiment of the present invention is shown in FIG. 2 and involves the attachment made between a column 36 which is skewed with respect to the beam 38 to be attached to the column. The skew of the column 36 is shown by the center line 40 through the pin 18 and the parallel line 42 at the bottom of the column 36 thereby illustrating a skew of angle θ. In this embodiment, the same components including the outside plates 26, the intermediate plates 22, the pin 18 and the oversize hole 20 in the web of the column 36 are employed except that the surfaces 44 on the intermediate plates 22 are tapered at the angle θ to accommodate the skewing.

I claim:

1. A method of assembling a connecting linkage between first and second structural members comprising the steps of:
   a. providing a circular hole of a selected diameter in a portion of said first structural member;
   b. inserting a cylindrical pin through said hole in said portion, said cylindrical pin having a diameter sufficiently less than said selected diameter to permit a desired amount of adjustability between said cylindrical pin and said first structural member;
   c. placing a pair of first support plates having holes therethrough on said cylindrical pin, one on each side of said portion of said first structural member, said holes therethrough having a diameter permitting assembly over said cylindrical pin but smaller than said selected diameter to prevent adjustment between said first pair of support plates and said cylindrical pin;
   d. placing a pair of second support plates having holes therethrough on said cylindrical pin, one on each side of said portion of said first structural member and adjacent to the respective first support plate said holes therethrough having a diameter permitting assembly over said cylindrical pin but smaller than said selected diameter to prevent adjustment between said second pair of support plates and said cylindrical pin;
   e. moving said first and second support plates and said cylindrical pin into a selected proper support position with respect to each other and with respect to said first and second structural members;
   f. attaching said first pair of support plates to said first structural member and said second pair of support plates to said second structural member.

2. A method as recited in claim 1 and further including the step of attaching said cylindrical pin to said second support plates.

* * * * *